United States Patent [19]

Guibert

[11] 4,352,567

[45] Oct. 5, 1982

[54] AUTOMATIC DOUGH-PROCESSING APPARATUS

[76] Inventor: Raul Guibert, 10374 Summer Holly Cir., Los Angeles, Calif. 90024

[21] Appl. No.: 272,344

[22] Filed: Jun. 10, 1981

[51] Int. Cl.³ .............................................. B29B 1/06
[52] U.S. Cl. ...................................... 366/76; 366/88; 366/89; 366/323
[58] Field of Search .................... 366/76, 79, 80, 81, 366/87, 88, 89, 97, 98, 99, 323, 302, 306, 307; 426/343; 425/208, 207, 200

[56] References Cited

U.S. PATENT DOCUMENTS

| | | | |
|---|---|---|---|
| 1,790,347 | 1/1931 | Hawkins | 366/165 |
| 2,896,556 | 7/1959 | Sippel | 366/76 |
| 3,354,504 | 11/1967 | Lehner | 366/76 |
| 3,694,227 | 9/1972 | Vezzani | 366/99 |
| 3,799,510 | 3/1974 | Schott | 366/79 |
| 3,888,997 | 6/1975 | Guibert | 366/81 |

Primary Examiner—Robert W. Jenkins
Attorney, Agent, or Firm—Michael Ebert

[57] ABSTRACT

An automatic dough-processing apparatus which includes a vertical assembly constituted by a tubular processing chamber whose upper end communicates with a metering tube of enlarged diameter to which flour is supplied. Coaxially mounted within the assembly is a rotating shaft having a main screw section of uniform diameter operating within the chamber and a conical valve section operating within the tube. Slidable within the metering tube is a ring which surrounds the valve section to define an annular valve orifice, the ring being axially shiftable by an adjusting element to set the size of the orifice. The flour admitted into the chamber by the metering tube is hurled by the main screw section against the inner wall of the chamber to create a thin flour film thereon which is bombarded by the solution to form a paste, the paste being then kneaded.

11 Claims, 5 Drawing Figures

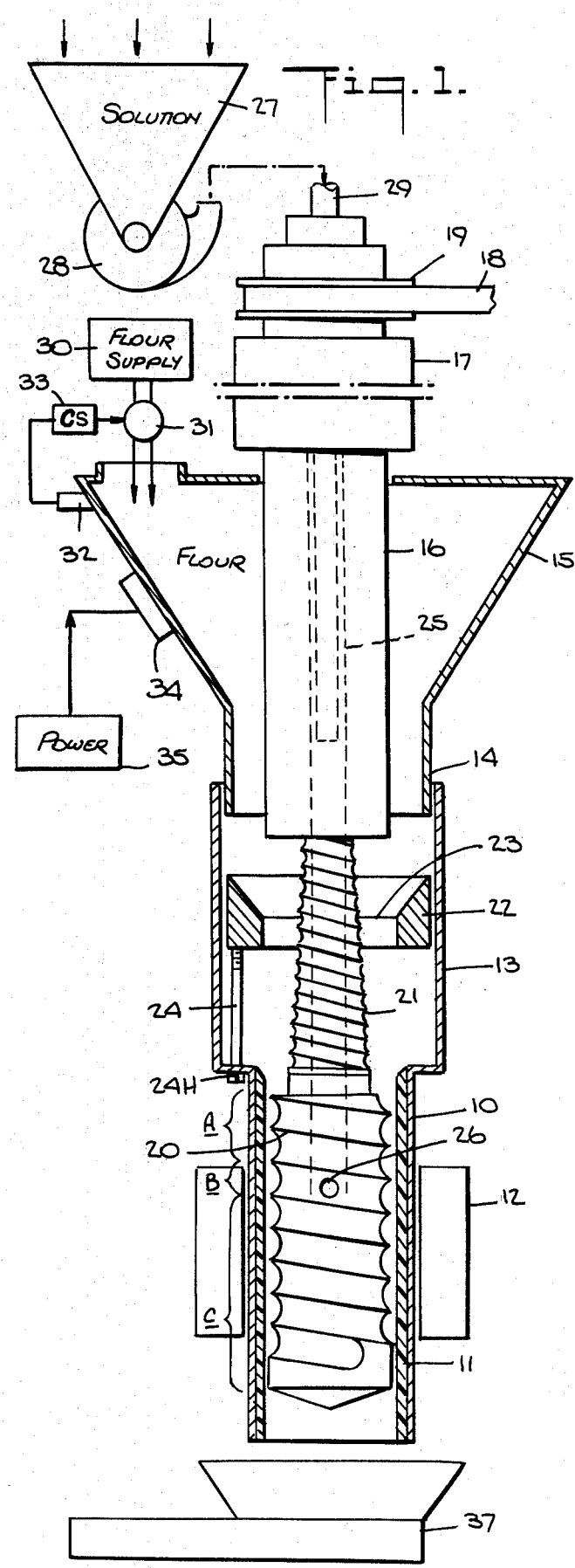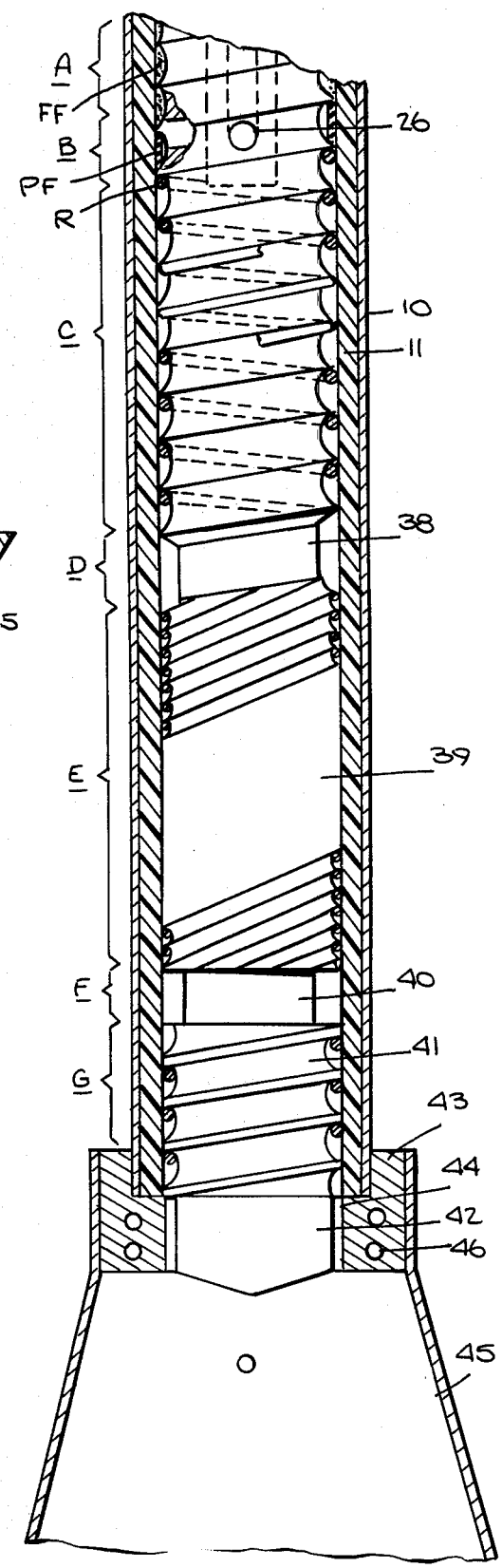

AUTOMATIC DOUGH-PROCESSING APPARATUS

BACKGROUND OF INVENTION

This invention relates generally to mechanisms for mixing a powder with a liquid to form a homogeneous mass, and more particularly to a high-speed, fully automatic dough processing apparatus.

While the invention will be described in connection with the production of dough for making bakery products such as bread, pizza and pastry, it is to be understood that the mixing mechanism included in the apparatus has many other practical applications unrelated to bakery products.

From the standpoint of production volume, bread is the most important baked product. Mixing is the first active step in bread production. The ingredients involved in mixing are flour and a dough-forming solution constituted typically by water, yeast, sugar, salt, milk and shortening. Ideally, mixing should result in a uniform mixture forming a smooth dough; it should develop the gluten in the dough in order to promote the elasticity of the dough and permit it to retain the gases generated by the yeast; and it should distribute the yeast cells uniformly so that they will receive proper nutrition.

In traditional techniques for producing dough, such as the batch method which uses heavy blades revolving in a large bowl to mix the flour and dough-forming solution into a homogeneous mass, a number of steps must be separately performed which render the process time-consuming and costly. Moreover, the resultant dough is not entirely homogeneous, giving rise to non-uniform dough balls and a final baked product of unpredictable consistency.

In my prior U.S. Pat. No. 3,888,997, entitled "Method and Apparatus for Processing Dough," there is disclosed a mechanism operating at exceptionally high speed to effect continuous mixing, all necessary steps being carried out automatically from the initial step of feeding the flour and the dough-forming solution into the machine to the final step of forming divided units of the processed dough ready for baking. This patented mechanism obviates many of the drawbacks experienced with conventional techniques.

In my prior patent, whose entire disclosure is incorporated herein by reference, a screw rotating within a vertical tubular chamber acts to centrifugally hurl flour fed into the chamber against the inner wall thereof, thereby depositing a thin film of flour on the inner wall. Also fed into the chamber is the dough-forming solution which is hurled centrifugally against the thin film of flour to form on the inner wall a pasty film which is directed downwardly along a helical path. The pasty film is scraped from the inner wall to produce a downwardly-extending ribbon that is subjected to a kneading action.

The flour fed into the mixing chamber is introduced therein through a hopper having an outlet of fixed dimensions. The practical difficulty with this fixed feed arrangement is that it fails to take into account the changing flowability of flour with variations in ambient temperature and humidity. It also does not accommodate the feed to the disparate characteristics of various flours. One, therefore, is not always able to attain optimum flour flow conditions.

Flour, which is a finely ground meal of wheat, is the backbone and structure of baked goods, flour acting both as a binding and absorbing agent. Wheat is the only cereal that contains the proper combination of glutenin and gliadin for bread-making. When combined with water, these constituents form gluten which is essential for retaining the gas produced by yeast.

However, the form of wheat used depends on the ultimate product. Thus there are several kinds of so-called hard wheat, the choice depending on the final product (i.e., rolls or bread). Cakes and cookies are derived from various types of soft wheat. In some instances, rye flour milled from rye grain may be blended into wheat flour.

The need exists, therefore, for means to adjust the feed of flour in an arrangement of the type disclosed in my prior patent to accommodate the machine to changing ambient conditions and to different flour characteristics.

Also in my patented machine, because it operates continuously, it is desirable that the dough-forming solution also be produced continuously in accordance with the demand of the machine rather than on a batch basis. When combining water, yeast and other ingredients in a mixing tank and then pumping the solution from the tank into the dough-forming machine, this necessarily results in a relatively prolonged interaction period within the tank, particularly with respect to that portion of the solution which is the last to be drawn therefrom. This prolonged interaction period may have deleterious effects with certain types of yeast, particularly instant yeast.

And while may patented machine includes a proofing tube through which processed dough leaving the chamber flows on its way to a cutting station, the proofing tube does not include means to heat the dough to the temperature best suited for proofing.

SUMMARY OF THE INVENTION

In view of the foregoing, the main object of this invention is to provide an apparatus for mixing a powder with a liquid to produce a homogeneous mass, the apparatus including means to adjust the input feed of flour thereto.

More particularly, an object of this invention is to provide an automatic dough processing apparatus in which the flour is fed into the input of a vertical mixing chamber by a tapered screw rotating within a metering tube, within which is a ring that surrounds this screw to define an annular orifice whose dimension is set by adjusting the axial position of the ring within the tube.

Also an object of the invention is to provide a dough-processing apparatus which effects continuous mixing of a flour and a dough-forming solution, which solution is produced continuously at a rate in accordance with the demand therefor.

Still another object of the invention is to provide an automatic dough-processing apparatus which includes a proofing stage in which the dough yielded by the apparatus is heated to an appropriate temperature.

Briefly stated, these objects are attained in a dough-processing apparatus which includes a vertical assembly constituted by a tubular processing chamber whose upper end communicates with a metering tube of enlarged diameter, into which flour is fed through an input hopper. Coaxially mounted within the assembly is a rotating shaft having a main single-helix screw section of uniform diameter operating within the chamber and a tapered multi-helix valve section operating within the metering tube.

Slidable within the metering tube is a ring which surrounds the tapered valve section to define therewith an annular valve orifice whose size depends on the axial position of the ring, this position being settable by an adjusting element. The flour admitted into the chamber by the metering tube is centrifugally hurled in a film-forming zone by the upper end portion of the main screw against the inner wall of the chamber to form a thin flour film thereon, this film passing into an atomizing zone wherein the solution which is fed through a channel extending longitudinally down the shaft to a radial set of nozzles is centrifugally hurled against the thin flour film to intimately admix therewith to form a pasty film on the inner wall. The main screw then directs the pasty film downwardly along the inner wall of the chamber into a kneading and development zone.

OUTLINE OF DRAWINGS

For a better understanding of the invention as well as other objects and further features thereof, reference is made to the following detailed description to be read in conjunction with the accompanying drawings, wherein:

FIG. 1 is a longitudinal section taken through a first embodiment of mixing apparatus in accordance with the invention;

FIG. 3 is a longitudinal section taken through a second embodiment of a dough-processing apparatus in accordance with the invention;

Figure 5:
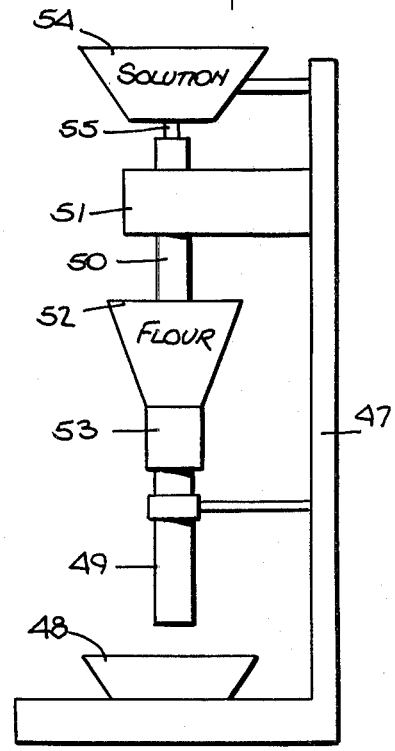

FIG. 5 schematically illustrates a home dough-processing unit.

DESCRIPTION OF INVENTION

First Embodiment:

Referring now to FIG. 1, there is shown a mixing apparatus in accordance with the invention for mixing a powder with a liquid. When the apparatus is to be used to produce a dough, the powder is flour and the liquid is a dough-forming solution; but for other types of powders, the liquid is appropriate to the nature of the powder.

The apparatus includes a vertically-mounted assembly in the form of a cylindrical casing 10 having an inner liner 11 therein, the upper end of the chamber being joined to and communicating with a metering tube 13 of enlarged diameter. Received within tube 13 is the cylindrical mouth 14 of a conical hopper 15. With the exception of the liner, the assembly is preferably fabricated of stainless steel or other high strength material that is non-reactive with the ingredients being processed. Liner 11 is preferably fabricated of a relatively soft, non-ferrous material such as Teflon (PTFE). The assembly is supported by a fixture 12 which in practice may be formed by a pair of complementary semi-cylindrical half pieces clamped about the chamber by suitable bolts.

Coaxially disposed within the assembly is a rotatable shaft 16 whose upper portion extends above hopper 15, the shaft being supported by a suitable bearing 17. The shaft is motor-driven at high speed through a belt 18 coupled to a pulley 19 keyed to the shaft.

Since the mixing action involves centrifugal force, one must bear in mind that the centrifugal force depends on the weight and mass of the body as well as gravity and is a linear function of the distance from the axis about which the body is rotating and the square of the angular velocity of the body about the axis of rotation. We have found that for a two-inch diameter screw, an adequate centrifugal force is produced at a rate of rotation of 3500 RPM. In order, therefore, to operate the mixer at a lower speed, say, 2,500 RPM with the same force, a larger diameter unit may be used. But in all instances, because mixing is effected by centrifugal force, the operating speed is much higher than with conventional blade type dough mixers.

Shaft 16 includes a main screw section 20 of uniform diameter which has a single-helix thread and is disposed within chamber 10 of the assembly. Above main screw section 20 is a valve section 21 which has a conical formation and a multi-helix thread, the valve section lying within metering tube 13. While valve section 21 is shown as being threaded, such threading functions only to agitate the flow to prevent agglomeration thereof.

Slidable within metering tube 13 and surrounding feeder section 21 to define an annular valve orifice 23 is a ring 22 whose inlet has a conical formation leading to the orifice. The axial position of ring 22 is settable by means of an adjusting element 24 which may take the form of a lead screw received in a threaded bore adjacent the periphery of the ring. The slotted head 24H of the adjusting element is outside of and below the metering tube, so that the axial position of the ring may be set by a screw driver to provide a valve orifice of the desired size.

Shaft 16 is provided with a longitudinally-extending central channel 25 which runs from the upper end of the shaft to one or more radial ducts or nozzles 26 bored into the main screw section 20 of the shaft at a position lying below the junction of feeder screw section 21 and main screw section 20.

The dough-forming solution is continuously prepared by feeding the ingredients thereof (water, yeast, salt, etc.) into a solution hopper 27 leading into a mixing pump 28 in which the ingredients are agitated and intermingled. The output of the pump is discharged into a pipe 29 received within the upper end of channel 25 in the rotating shaft of the mixing pump, the diameter of the pipe being smaller than that of the channel, so that the fixed pipe does not interfere with rotation. In practice, rather than feed the output of mixing pump 28 directly into pipe 29, it may be fed into a buffer tank and from there into pipe 29, the buffer tank serving to stabilize the solution and in effect to filter out the pulsations thereof produced by the mixing pump.

The supply of ingredients fed into the mixing pump is coordinated with the demand therefor by the dough-processing apparatus so that the dough-forming solution is continuously produced at an appropriate rate, and there is effectively no dwell period during which the solution is held awaiting use in the dough-processing apparatus.

Flour from a supply 30 is fed into flow input hopper 15 through a feeder screw mechanism 31 or similar means. Hopper 15 is provided with a flour level sensor 32 which applies a signal to a control system 33 for feeder screw mechanism 31, the control arrangement being such as to maintain a desired level of flour in hopper 15. Hopper 15 is physically vibrated by an electrically-driven vibrator 34 energized by a power source 35 to prevent the flour from agglomerating and clogging the hopper.

Thus the level of flow in hopper 15 is maintained as flow is fed into the chamber at a rate controlled by the adjusted size of the valve orifice in metering tube 13, the dough-forming solution being concurrently supplied into the chamber.

In practice, instead of changing the size of the orifice in metering tube 13 by axially shifting ring 22 relative to the valve section 21, the casing 10 may be arranged so that it can be axially shifted relative to shaft 16, thereby changing the size of the orifice between valve section 21 and the inlet to the casing. The term "dough" as used herein is not limited to flour compositions, but encompasses any powder mixed with a liquid to form a paste-like composition.

Figure 2:
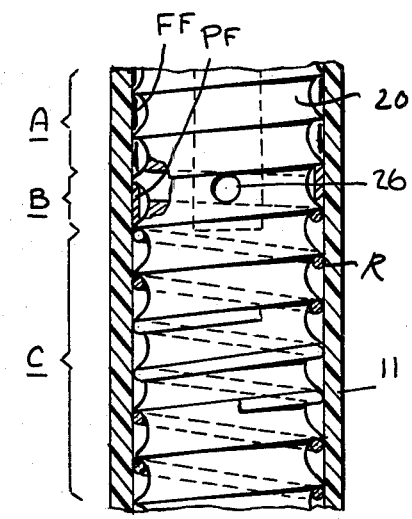
FIG. 2 is an enlargement of the processing chamber included in the apparatus shown in FIG. 1.

Operation:

The flow entering the uppermost flight of main screw 20 of the shaft in chamber 10 is directed downwardly into a film-forming zone A, as shown in FIG. 2. Because of the high speed of the shaft, the particles of flour are centrifugally hurled outwardly against the surface of inner liner 11 to form thereon a thin, downwardly-moving flour film FF. Any flow particles coming in contact with the trough surfaces of the flights of main screw 20 will instantly be thrown outwardly at high speeds to bombard and admix with flour film FF.

The nozzles 26 which eject the dough-forming solution are located in a flight of main screw 20 just below film-forming zone A within an atomizing zone B. The solution is hurled from nozzles 26 centrifugally against the flour film emerging from film-forming zone A to become atomized and admixed therewith in atomizing zone B to produce a pasty, homogenized mass PF in film form, the pasty film moving down the chamber.

Thus pasty film PF is no longer in powdered form and is now in condition to be mechanically worked into a dough. This is effected within the kneading and development zone C, wherein the outer peaks of the screw flights engage the moist mass and form it into a ribbon R of almost circular cross section extending downwardly along the screw in a helical formation. Because the helical screw threads in the kneading and development section C present sharp edges to the inner surface of liner 11, they act to scrape the paste into a ribbon formation.

Since ribbon R is positioned between and engaged by the inner surface of liner 11 and the upper region of the screw flights, the round ribbon is operatively curled and rotated in the upward direction and is at the same time being urged by the rotating screw downwardly along a helical path. This compound action serves to effect kneading and development of the dough as the ribbon thereof travels downwardly in zone C, from which it is discharged from the chamber. The number of screw flights in zone C depends, of course, on the amount of kneading time required for particular ingredients and the prevailing conditions.

The dough discharged from the chamber may then be deposited in the input hopper of independently-operated stages 37, including proofing and dough-dividing stages, from which the dough balls are delivered to an oven. The actions carried out after kneading and development are set forth in detail in applicant's prior patent.

It is to be noted that even when the dough does not include yeast but is made out of wheat flour and egg or some other dough-forming liquid, as in the case of pasta, mixing is, of course, necessary, and kneading is essential in order to produce a pasta dough that has a smooth elastic consistency, but proofing is not required.

Figure 4:
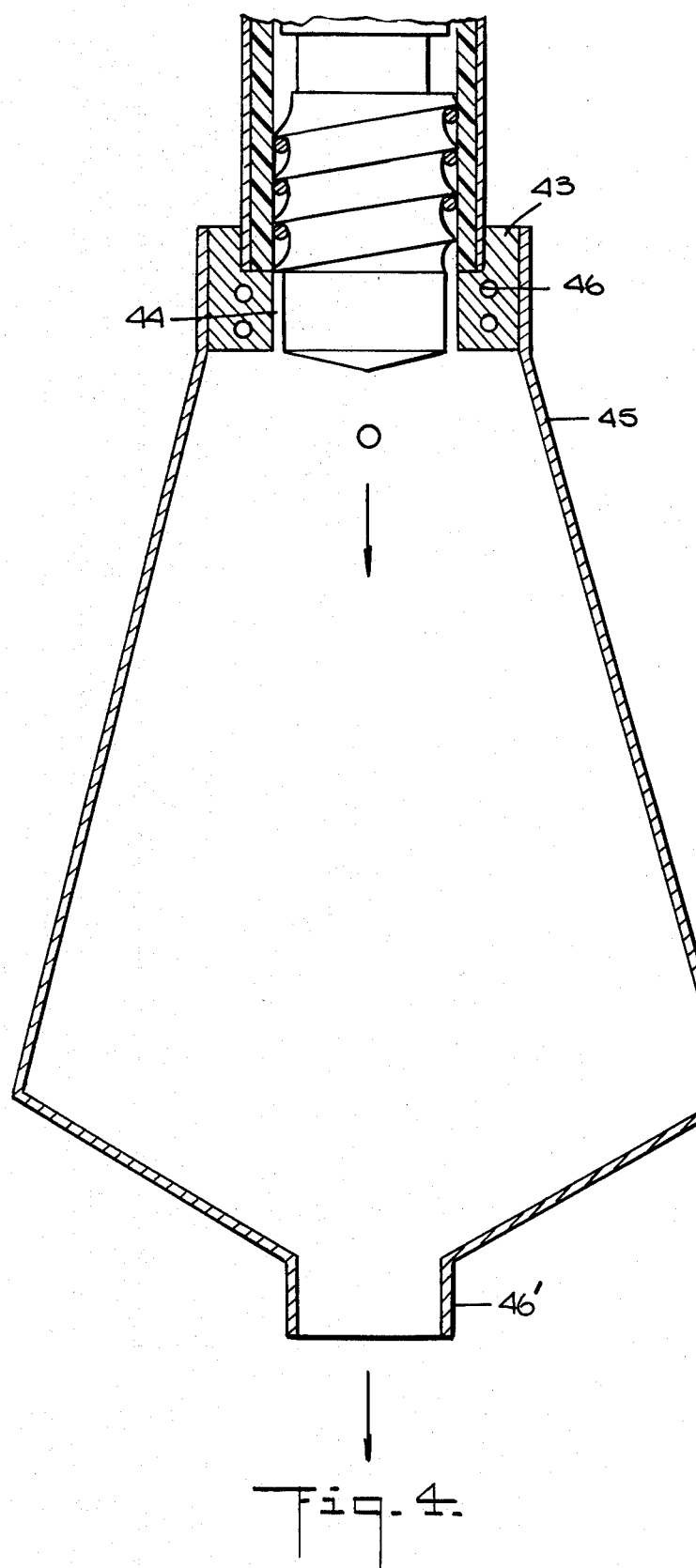
FIG. 4 is an enlargement of the proofing zone of the apparatus.

Second Embodiment:

The dough-processing mechanism shown in FIGS. 3 and 4 is essentially the same as that shown in FIG. 1 with respect to the manner in which the flour and the dough-forming solution are introduced and with regard to the processing activity in zones A, B and C. However, in the mechanism in FIGS. 3 and 4, chamber 10 is extended beyond zone C into a succession of zones D, E, F and G.

In zone D, the shaft section 38 is of constricted diameter in an unthreaded formation to define an annular accumulation compartment in which the ribbon R from zone C is accumulated before being introduced into a zone E where the shaft section 39 is in a multiple helix formation to produce relatively fine dough ribbons to facilitate further kneading and development before the dough is received in a second accumulation zone F where the shaft section 40 is again of constricted diameter.

Because the mixer shaft is turning at high speed (i.e., 3500 RPM), ribbon R passes through the mixing chamber in a helical path at high speed, and the kneading action is insufficient if the diameter of the ribbon is relatively large. It is mainly the outer layer of the ribbon that is subjected to the kneading action, the core thereof being somewhat isolated from this action. However, by subdividing ribbon R in the multi-helix zone E into finer ribbons, the resultant kneading action provides the required degree of development despite the rapidity of this action.

From accumulation zone F, the dough enters a pumping zone G where the single helix shaft section 41 acts to deliver dough in ribbon form into an annular passage 44 formed between a core piece 42 and an outer cylinder 43 of the inlet to a proofing chamber 45. Embedded in cylinder 43 are coils 46 which are electrically heated or which conduct a heated liquid to head the dough to the extent necessary. Thus the dough enters the proofing chamber at the proper proofing temperature.

The proofed dough from proofing chamber 45, which has a conical formation is extruded through a cylindrical outlet 46' of small diameter, the extruded dough then being divided and further processed for making baked toods. The dimensions of the proofing chamber is related to the rate of dough production and the required proofing time.

In the system shown in FIG. 3, the yeast dough emerging from the processing chamber into the proofing chamber must be at the optimum proofing temperature; for a temperature that is too low will render the yeast dormant and one that is excessive may kill the yeast. In order, therefore, to feed the dough into proofing chamber 45 at the optimum proofing temperature, the incoming water in the dough-forming solution is heated to a level which takes into account the exothermic reaction of the yeast and the friction produced by the rotating mixing mechanism.

Because of the variables involved, it is not possible to produce a dough at the output of the mixer which is at the desired proofing temperature. Hence the incoming water is heated to a degree resulting in a dough temperature somewhat below the optimum value. By sensing the actual temperature of the dough emerging from the mixing chamber, one is able to regulate heater 46 so as to raise the temperature of the dough entering proofing chamber 45 to the optimum proofing level.

In a conventional proofing chamber, the dough in the chamber is heated to the proofing level from heaters external thereto; hence the time it takes to penetrate and bring the entire body of the dough to the required proofing temperature is relatively prolonged, and the proofing period is thereby extensive. But in the present arrangement, the dough admitted into the proofing chamber is at the proofing temperature and the proofing period is therefore short.

Because in the present arrangement the dough goes directly and continuously into the proofing chamber from the mixer, the dough is isolated from the atmosphere, and there is no need, as with conventional proofing chambers, to control atmospheric conditions.

Where the dough is not to be immediately baked but is to be stored in the frozen state for subsequent proofing and baking, instead of heating the dough going into the proofing chamber, the dough may be chilled by means of a refrigerator jacket surrounding inlet 44, so as to render the yeast dormant. In this instance, chamber 45 does not perform a proofing function. From chamber 45, the chilled dough may be placed in a suitable freezer.

Home Unit:

Referring now to FIG. 5, there is shown a portable dough mixer unit which is a compact version of the mixer shown in FIG. 1 for rapidly producing a smooth, homogeneous dough for do-it-yourself home bakers, such as those who enjoy making their own bread and yet wish to avoid the fuss and difficulties entailed in conventional dough producing procedures.

The unit includes a stand 47 at whose base is a bowl 48 to receive the dough emerging from a mixing chamber 49 having rotating shaft 50 therein of the type shown in FIG. 1. The shaft is supported on a bearing 51 cantilevered from stand 47. The flour for the dough is introduced through hopper 52 from which it flows into metering tube 53. The dough-forming liquid solution is poured into hopper 54 from which it goes through pipe 55 into the center channel in shaft 50, from which it flows into lateral nozzles that act to hurl the ejected liquid against a dry flour film to create a paste film which is thereafter kneaded and developed.

Thus the operator has merely to add the necessary quantities of flour and liquid solution and in a very short time emerging from the unit is dough suitable for baking.

While there have been shown and described preferred embodiments of an automatic dough-processing apparatus in accordance with the invention, it will be appreciated that many changes and modifications may be made therein without, however, departing from the essential spirit thereof.

I claim:

1. An apparatus for mixing flour or any other powder with a liquid solution to produce a homogeneous dough, said apparatus comprising:
   (A) a vertically-mounted assembly constituted by a tubular processing chamber whose upper end communicates with a metering tube to which said powder is supplied;
   (B) a rotating shaft coaxially mounted in said assembly, said shaft having a main screw section of uniform diameter operating within the chamber, and a conical valve section operating within the tube;
   (C) a ring slidable within the metering tube and surrounding the valve section to define an annular valve orifice, the ring being axially shiftable by an adjustable element to set the size of the orifice, whereby the flour admitted into the chamber through the metering tube is hurled by the main screw section against the inner wall of the chamber in a film-forming zone to create a thin powder film thereon;
   (D) means to introduce the solution through a channel in said shaft communicating with a lateral nozzle just below the film-forming zone to cause the powder film to be bombarded by the solution to form a paste in a paste-forming zone, which paste is then kneaded by the main screw in a kneading zone just below the paste-forming zone to form the dough.

2. An apparatus as set forth in claim 1, wherein said valve section is threaded.

3. An apparatus as set forth in claim 2, further including a flour source coupled to the flour hopper and means to sense the level of powder in the flour hopper to produce a signal for controlling the flow of powder from the source to maintain a desired level of powder.

4. An apparatus as set forth in claim 1, wherein said powder is introduced into said tube through a hopper which is subjected to a vibratory action to facilitate flow.

5. An apparatus as set forth in claim 1, wherein said liquid solution is formed in a mixing pump into which are concurrently fed the ingredients for the solution, the output of the pump being fed directly into said channel.

6. An apparatus as set forth in claim 1, wherein said chamber is formed by a stainless steel cylinder having an inner liner of PTFE material.

7. An apparatus as set forth in claim 1, further including a proofing stage into which is fed the dough, said proofing stage including an annular inlet surrounded by means to raise the temperature of the dough to a level suitable for proofing.

8. An apparatus as set forth in claim 7, wherein said means includes a coil.

9. An apparatus as set forth in claim 7, wherein said proofing stage includes a proofing chamber having an outlet through which the proofed dough is extruded.

10. An apparatus as set forth in claim 1, further including a stage into which the dough is fed through an inlet having means to chill the dough.

11. An apparatus as set forth in claim 1, wherein said adjusting element is a lead screw which extends into said metering tube along an axis parallel to the axis of rotation of the shaft, said screw threadably engaging a bore in the ring.

* * * * *